United States Patent
Chang

(10) Patent No.: US 7,871,172 B2
(45) Date of Patent: Jan. 18, 2011

(54) DIFFUSION PLATE AND BACKLIGHT MODULE USING SAME

(75) Inventor: Shao-Han Chang, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 246 days.

(21) Appl. No.: 12/319,046

(22) Filed: Dec. 31, 2008

(65) Prior Publication Data

US 2010/0008064 A1    Jan. 14, 2010

(30) Foreign Application Priority Data

Jul. 11, 2008    (CN) .................. 2008 1 0302713
Jul. 23, 2008    (CN) .................. 2008 1 0302951

(51) Int. Cl.
G09F 13/08    (2006.01)
(52) U.S. Cl. .............. 362/97.3; 362/333; 362/628
(58) Field of Classification Search ....... 362/97.1–97.3, 362/330–331, 333, 620, 626, 628; 349/61–63, 349/66; 359/619
See application file for complete search history.

(56) References Cited

U.S. PATENT DOCUMENTS

| 7,712,945 | B2 * | 5/2010 | Hsu et al. | 362/620 |
| 7,758,199 | B2 * | 7/2010 | Chang | 362/97.3 |
| 2008/0043488 | A1 * | 2/2008 | Lee et al. | 362/606 |
| 2009/0086509 | A1 * | 4/2009 | Omori et al. | 362/628 |

* cited by examiner

*Primary Examiner*—John A Ward
(74) *Attorney, Agent, or Firm*—Clifford O. Chi

(57) ABSTRACT

A light diffusion plate includes a first surface and an opposite second surface. The first surface defines a plurality of first elongated arc-shaped grooves and a plurality of second elongated arc-shaped grooves therein. A width of the first elongated arc-shaped grooves decreases and a width of the second elongated arc-shaped grooves increase along the direction from one side to another side. The second surface forms a plurality of first elongated arc-shaped protrusions and a plurality of second elongated arc-shaped protrusions thereon. A width of the first elongated arc-shaped grooves decreases gradually and a width of the second elongated arc-shaped grooves increases gradually along the direction from one side to another side. A width of the first elongated arc-shaped protrusions decreases gradually and a width of the second elongated arc-shaped protrusions increases gradually along the direction from one side to another side.

17 Claims, 15 Drawing Sheets

US 7,871,172 B2

DIFFUSION PLATE AND BACKLIGHT MODULE USING SAME

CROSS-REFERENCE TO RELATED APPLICATIONS

This application is related to four co-pending U.S. patent applications, which are: and applications Ser. Nos. 12/319,045, 12/319,044, 12/319,043, and 12/319,042, and all entitled "OPTICAL PLATE AND BACKLIGHT MODULE USING THE SAME". In the co-pending applications, the inventor is Shao-Han Chang. The co-pending applications have the same assignee as the present application. The disclosure of the above identified applications is incorporated herein by reference.

BACKGROUND

1. Technical Field

The present invention relates to a light diffusion plate and a backlight module using the same and, particularly, to a light diffusion plate and a backlight module using the same employed in a liquid crystal display.

2. Description of the Related Art

Referring to FIGS. 12 and 13, a typical direct type backlight module 100 includes a frame 110, a plurality of light sources 120, a light diffusion plate 130, and a typical prism sheet 140. The light sources 120 are positioned in an inner side of the frame 110. The light diffusion plate 130 and the typical prism sheet 140 are positioned on the light sources 120 above a top of the frame 110. The light diffusion plate 130 includes a plurality of diffusing particles (not shown) configured for diffusing light. The typical prism sheet 140 includes a transparent substrate 141 and a prism layer 143 formed on a surface of the transparent substrate 141. A plurality of elongated V-shaped ridges 145 is formed on the prism layer 143.

In use, light emitted from the light sources 120 enters the diffusion plate 130 and becomes scattered. The scattered light leaves the diffusion plate 130, travels through the typical prism sheet 140, and refracts out at the elongated V-shaped ridges 145.

The refracted light leaving the typical prism sheet 140 is concentrated at the prism layer 143, increasing the brightness of the prism sheet 140. The refracted light propagates into a liquid crystal display panel (not shown) positioned above the prism sheet 140.

However, although light from the light sources 120 enters the diffusion plate 130 and becomes scattered, the light leaves the prism sheet 140, and forms strong light spots.

In order to reduce or eliminate the strong light spots, the backlight module 100 should further include an upper light diffusion film 150 positioned on the prism sheet 140.

However, although the upper light diffusion film 150 and the typical prism sheet 140 contact each other, a plurality of air pockets exist around the boundaries of the light diffusion film 150 and the typical prism sheet 140. When light passes through the air pockets, some of the light undergoes total reflection along one or more corresponding boundaries. The upper light diffusion film 150 may absorb a certain amount of the light from the prism sheet 140. As a result, a brightness of light illumination of the backlight module 100 is reduced. In addition, the matrix of the elongated V-shaped ridges 145 is substantially the same as the pixel matrix of the panel, fringes of Morie Interference often appears on the panel, and the display effect is affected.

Therefore, a new diffusion plate and a new backlight module are desired to overcome the above-described shortcomings.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION OF THE EMBODIMENTS

Figure 1:
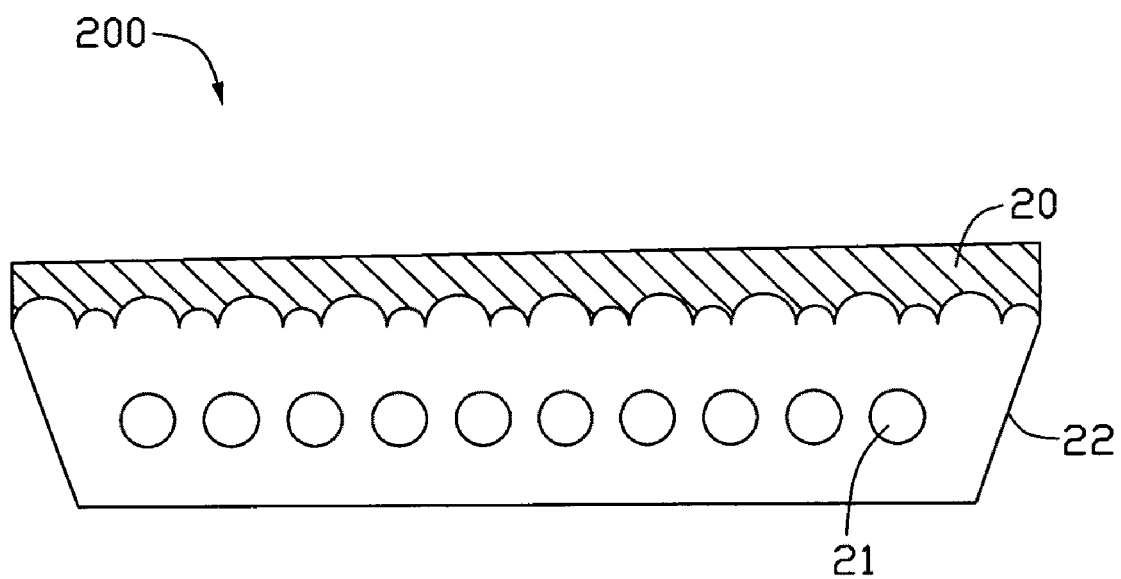
FIG. 1 is a cross-sectional view of a first embodiment of a backlight module, the backlight module including a light diffusion plate, a plurality of light sources, and a frame.

Referring to FIG. 1, a first embodiment of a backlight module 200 includes a light diffusion plate 20, a plurality of light sources 21, and a frame 22 for receiving the light sources 21. The frame 22 includes a highly reflective inner surface. In the illustrated embodiment, the light sources 21 are a plurality of light emitting diodes arranged in a straight line. The light diffusion plate 20 is positioned above the light sources 21, so that light emitted from the light sources 21 and reflected from the frame 22 can directly enter the light diffusion plate 20.

Figure 2:
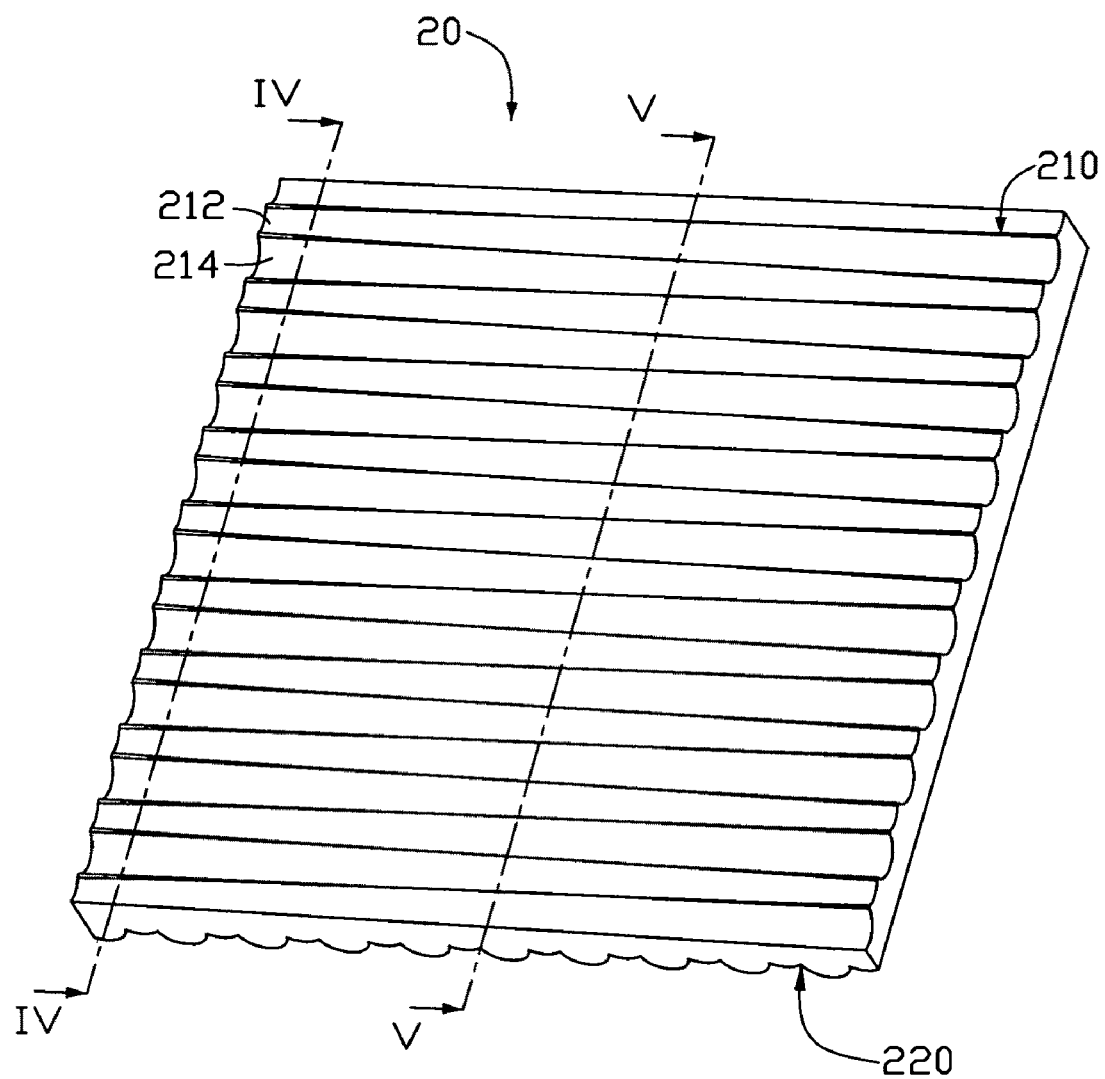
FIG. 2 is an isometric view of the light diffusion plate of the backlight module of FIG. 1.
Figure 3:
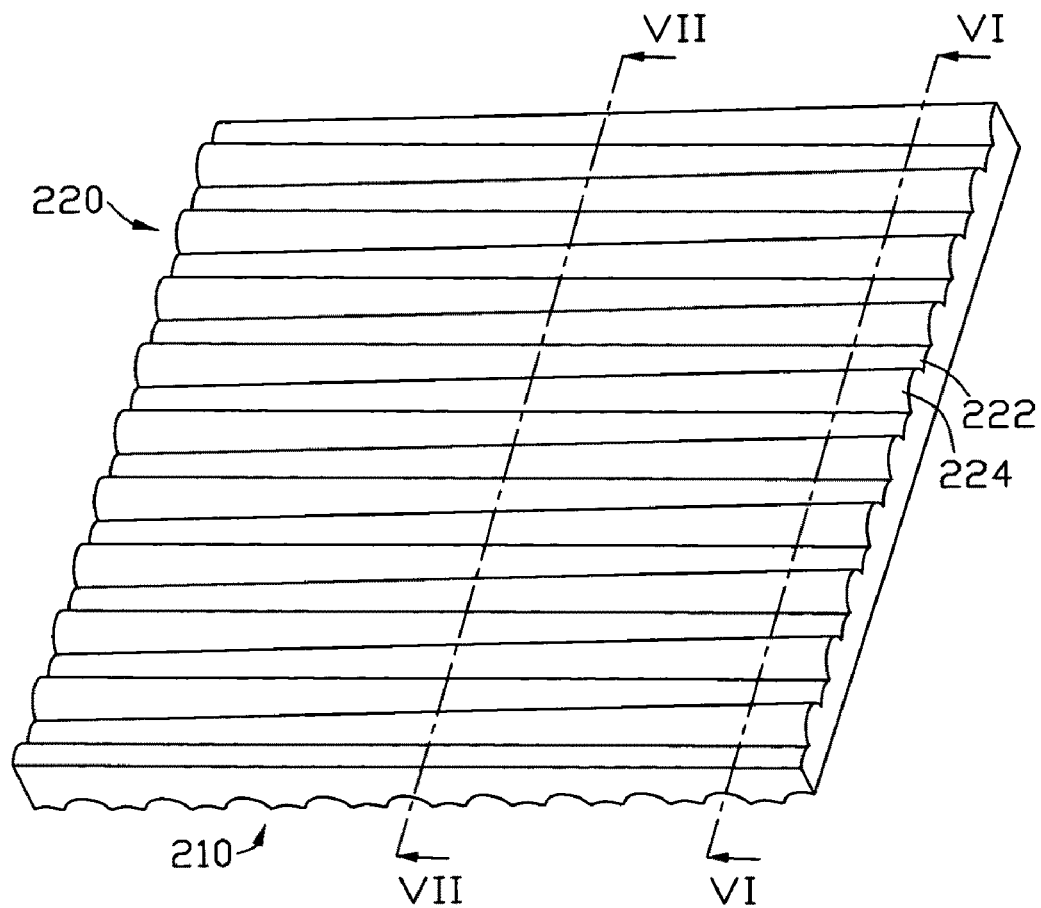
FIG. 3 is similar to FIG. 2, but viewed from another aspect

Referring to FIGS. 2 and 3, the light diffusion plate 20 includes a first surface 210, a second surface 220 opposite the first surface 210, a first side surface (not labeled), a second side surface (not labeled) opposite the first side surface, a third side surface (not labeled) connecting the first and second side surfaces, and a fourth side surface (not labeled) opposite the third side surface.

The first surface 210 defines a plurality of first elongated arc-shaped grooves 212 and a plurality of second elongated arc-shaped grooves 214. The first elongated arc-shaped grooves 212 are substantially parallel to each other, and the second elongated arc-shaped grooves 214 are substantially parallel to each other. The elongated arc-shaped grooves 212 and the second elongated arc-shaped grooves 214 are positioned on the first surface 210 extending from the first side surface to the second side surface in an alternating manner. A width and a depth of each first elongated arc-shaped groove 212 gradually decrease from the first side surface to the second side surface. A width and a depth of each second elongated arc-shaped groove 214 gradually increase from the first side surface to the second side surface.

The second surface 220 forms a plurality of first elongated arc-shaped protrusions 222 and a plurality of second elongated arc-shaped protrusions 224. The first elongated arc-shaped protrusions 222 are substantially parallel to each other, and the second elongated arc-shaped protrusions 224 are substantially parallel to each other. The elongated arc-shaped protrusions 222 and the second elongated arc-shaped protrusions 224 are positioned on the second surface 220 extending from the third side surface to the forth side surface. A width and a height of each first elongated arc-shaped protrusion 222 gradually decrease from the first side surface to the second side surface. A width and a height of each second elongated arc-shaped protrusion 224 gradually increase from the third side surface to the forth side surface.

An extending direction of the first elongated arc-shaped grooves 212 and the second elongated arc-shaped grooves 214 is substantially perpendicular to an extending direction of the first elongated arc-shaped protrusions 222 and the second elongated arc-shaped protrusions 224. In an alternative embodiment, the extending direction of the first elongated arc-shaped grooves 212 and the second elongated arc-shaped grooves 214 may intersect with the extending direction of the first elongated arc-shaped protrusions 222 and a plurality of second elongated arc-shaped protrusions 224 at other angles.

Figure 4:
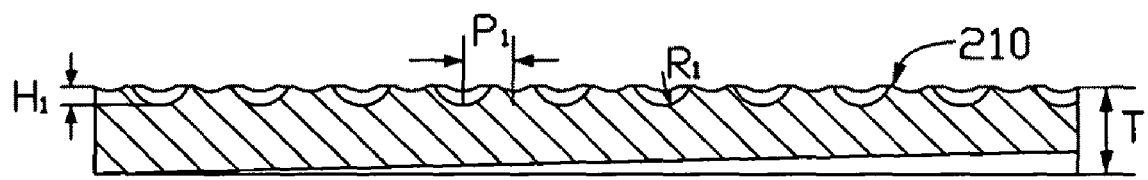
FIG. 4 is a cross-sectional view of the light diffusion plate of FIG. 2, taken along line IV-IV.
Figure 5:
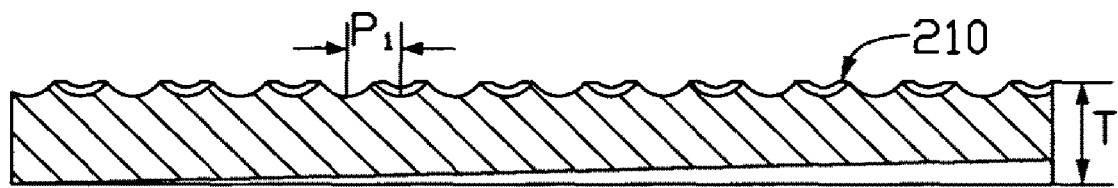
FIG. 5 is a cross-sectional view of the light diffusion plate of FIG. 2, taken along line V-V.

Referring also to FIGS. 4 and 5, a cross-section of each first elongated arc-shaped groove 212 and each second elongated arc-shaped groove 214 taken along a plane perpendicular to the extending direction of the first elongated arc-shaped grooves 212 and the second elongated arc-shaped grooves 214 is substantially semicircular. It should be appreciated that the cross-section of the first elongated arc-shaped grooves 212 and the second elongated arc-shaped grooves 214 may be elliptical. A radius of the first elongated arc-shaped grooves 212 may be smaller than a radius of the second elongated arc-shaped grooves 214 as shown in a cross-section view taken along the line IV-IV, but may be substantially the same as shown in a cross-section view taken along the line V-V. A pitch $P_1$ between center lines of adjacent first and second elongated arc-shaped grooves 212, 214 is about 0.025 mm to about 1.5 mm. A radius $R_1$ of the cross-section of each of the first elongated arc-shaped grooves 212 and the second elongated arc-shaped grooves 214 is about 0.006 mm to about 3 mm. A maximal depth $H_1$ of the first and second elongated arc-shaped grooves 212, 214 is about 0.01 mm to about 3 mm.

Figure 6:
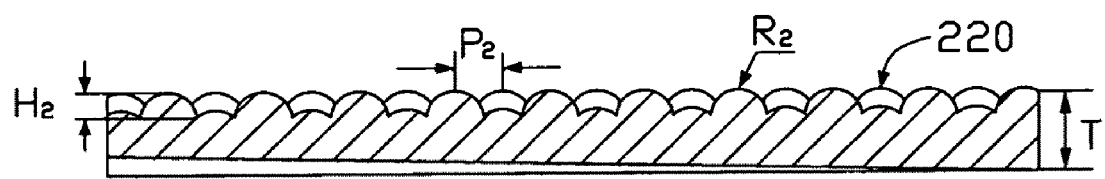
FIG. 6 is a side cross-sectional view of the light diffusion plate of FIG. 3, taken along line VI-VI.
Figure 7:
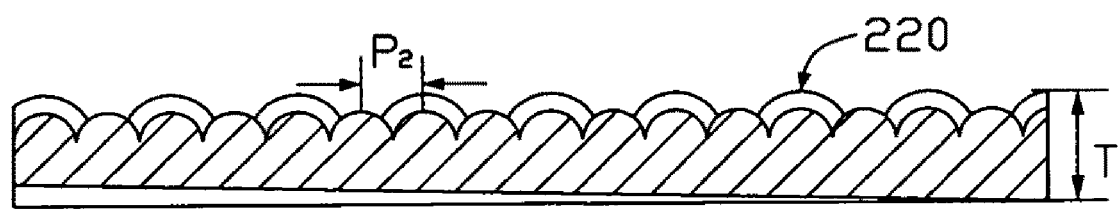
FIG. 7 is a side cross-sectional view of the light diffusion plate of FIG. 3, taken along line VII-VII.

Referring to FIGS. 6 and 7, a cross-section of the first elongated arc-shaped protrusions 222 and the second elongated arc-shaped protrusions 224 taken along a plane perpendicular to the extending direction of the elongated arc-shaped protrusions 224 is substantially semicircular. In one embodiment, the cross-section of the first elongated arc-shaped protrusions 222 and the second elongated arc-shaped protrusions 224 may be elliptical. A diameter of the first elongated arc-shaped protrusions 222 is smaller than a diameter of the second elongated arc-shaped protrusions 224 as shown in a side cross-section view taken along the line VI-VI, but may be substantially the same as shown in a side cross-section view taken along the line VII-VII. A radius $R_2$ of the cross-section of the first elongated arc-shaped protrusions 222 is about 0.006 mm to about 3 mm, a pitch $P_2$ between center lines of adjacent first and second elongated arc-shaped protrusions 222, 224 is about 0.025 mm to about 1.5 mm, and a maximal depth $H_2$ of the first and second elongated arc-shaped protrusions 222, 224 is about 0.01 mm to about 3 mm.

A thickness T of the light diffusion plate 20 is in the range from about 0.5 mm to about 3 mm. The light diffusion plate 20 may be made of transparent materials such as polycarbonate, polymethyl methacrylate, polystyrene, and copolymer of methyl methacrylate and styrene. In an alternative embodiment, the light diffusion plate 20 may include light diffusion particles uniformly dispersed therein to further scatter the light.

The first surface 210 faces the light sources 21. Light enters the light diffusion plate 20 via the first surface 210. Since inner surfaces of the first elongated arc-shaped grooves 212 and the second elongated arc-shaped grooves 214 are arc-shaped, incident light scatters and becomes more uniform. The first elongated arc-shaped protrusions 222 and the second elongated arc-shaped protrusions 224 can concentrate light such that a light energy utilization ratio can be improved. A matrix of micro-structures (arc-shaped grooves 212, 214 and arc-shaped protrusions 222, 224) on both the first surface 210 and the second surface 220 is different from a pixel matrix of a panel. As a result, there is little or no Morie Interference.

Referring to Table 1 below, the following five test samples are provided.

TABLE 1

| Sample no. | Sample description |
|---|---|
| 1 | LED |
| 2 | LED with the typical prism sheet 140 (shown in FIG. 14) |
| 3 | LED with the light diffusion plate 20 (shown in FIG. 2) |
| 4 | LED with the typical prism sheet 140 (shown in FIG. 14) and a panel |
| 5 | LED with the light diffusion plate 20 (shown in FIG. 2) and a panel |

Figure 8:
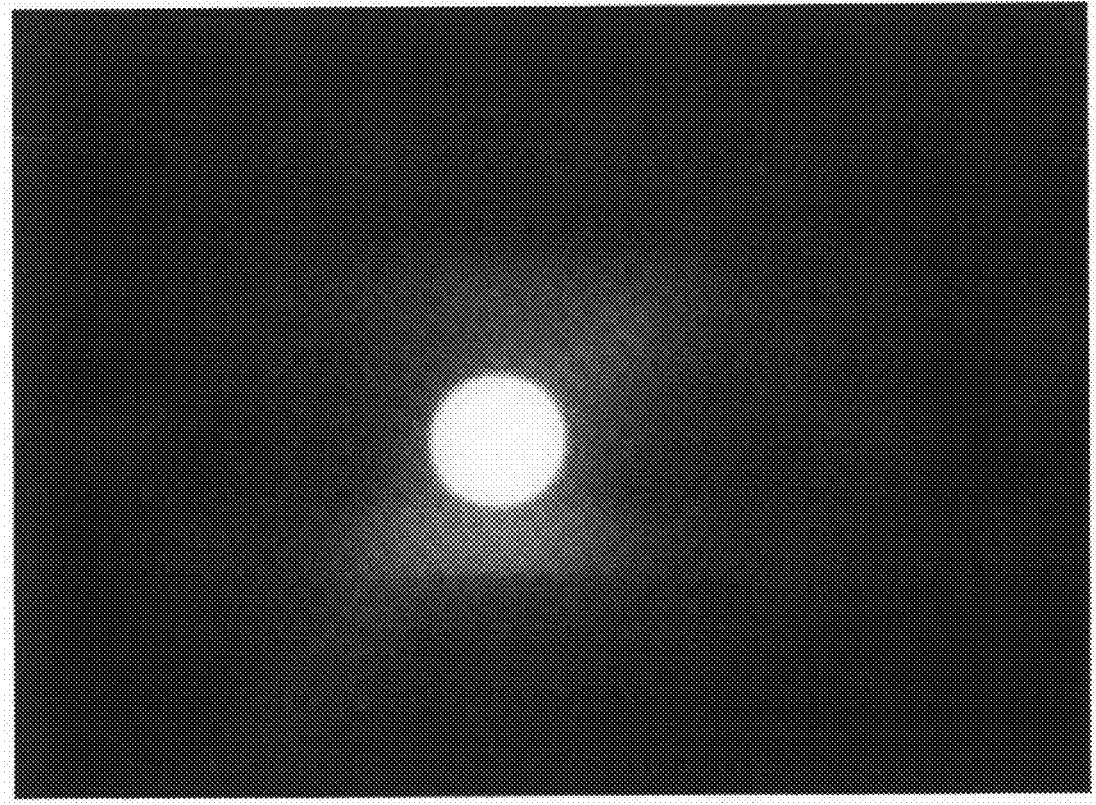
FIG. 8 is a photo showing an illumination distribution in a test of a light emitting diode.
Figure 9:
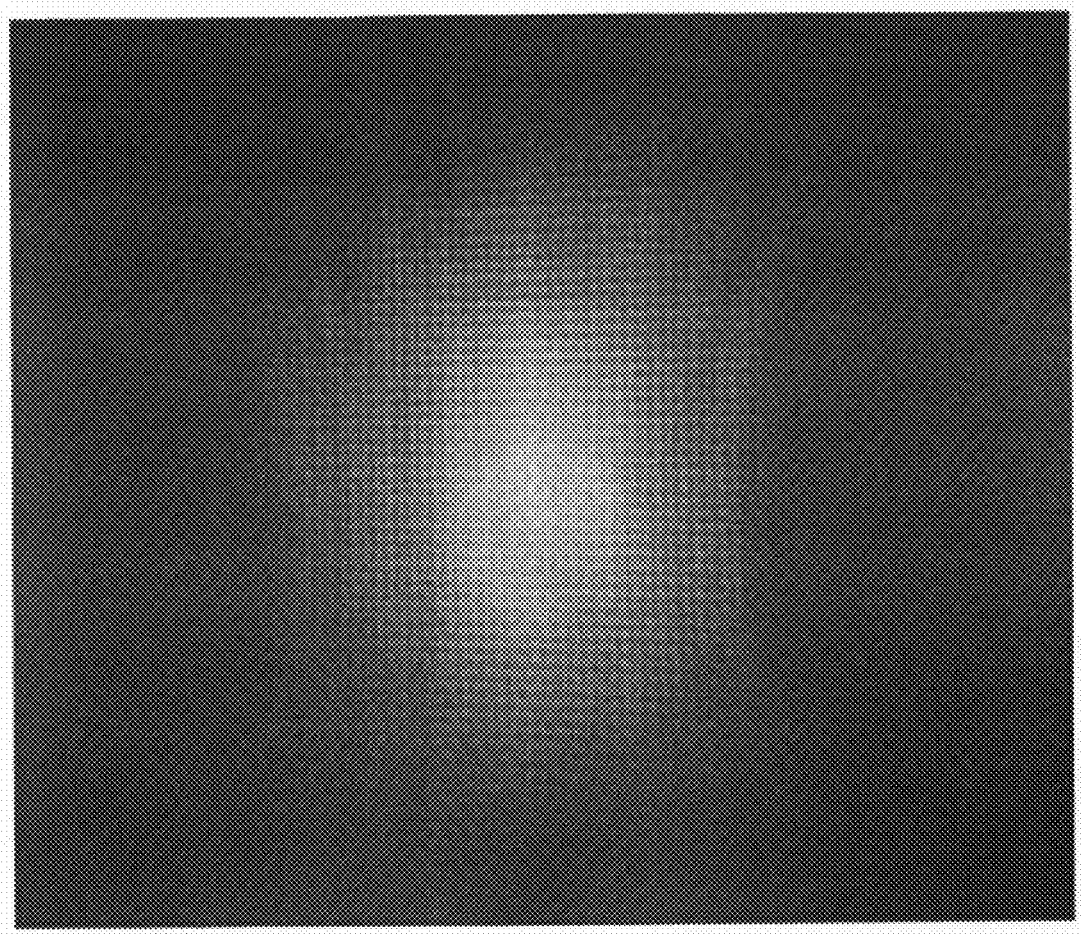
FIG. 9 is a photo showing an illumination distribution in a test of a backlight module using the light diffusion plate shown in FIG. 2.
Figure 10:
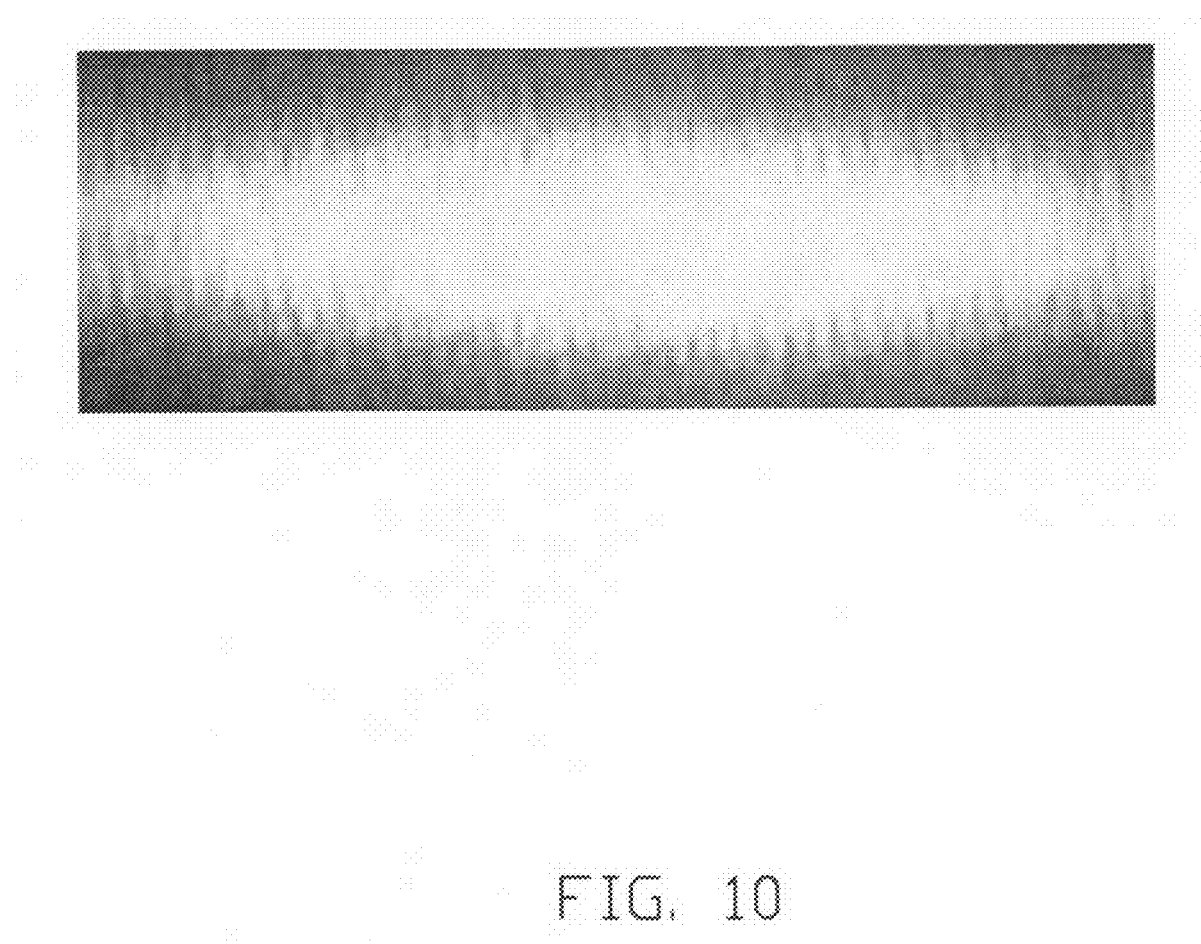
FIG. 10 is a photo showing an illumination distribution in a test on a LCD panel employing the backlight module shown in FIG. 1.
Figure 14:
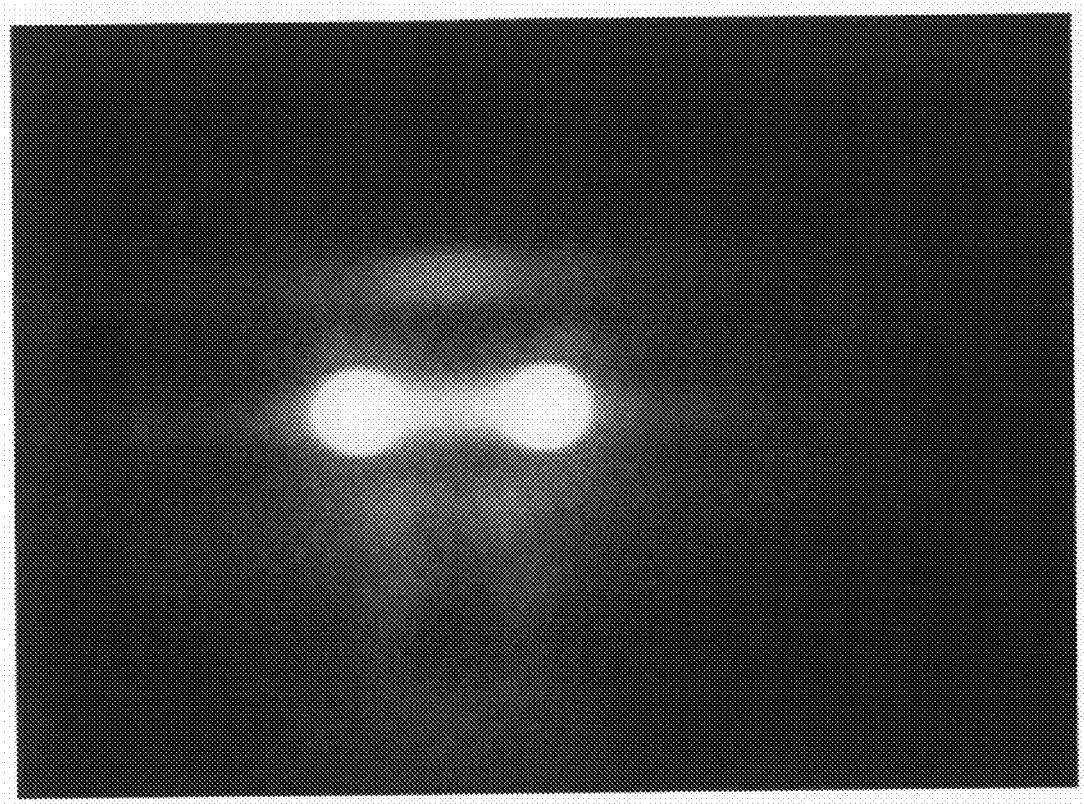
FIG. 14 is a photo showing an illumination distribution in a test of the typical backlight module using the typical prism sheet shown in FIG. 13.

FIG. 8, FIG. 9 and FIG. 14 are test results from the samples 1 through 3 as shown in Table 1. A LED is a point source (shown in FIG. 8), and light from the LED forms two relatively strong spots on the typical prism sheet 10 (shown in FIG. 9). In contrast, light spots formed on the light diffusion plate 20 are relatively weak (shown in FIG. 14). The test results show light emitted from the light diffusion plate 20 is more uniform. Therefore, when the prism sheet 20 is employed in a backlight module, strong light spots from the light sources seldom occur, more uniform light is achieved, and an upper light diffusion film positioned above the prism sheet 20 is unnecessary. Thus, the efficiency of light utilization is enhanced.

Figure 12:
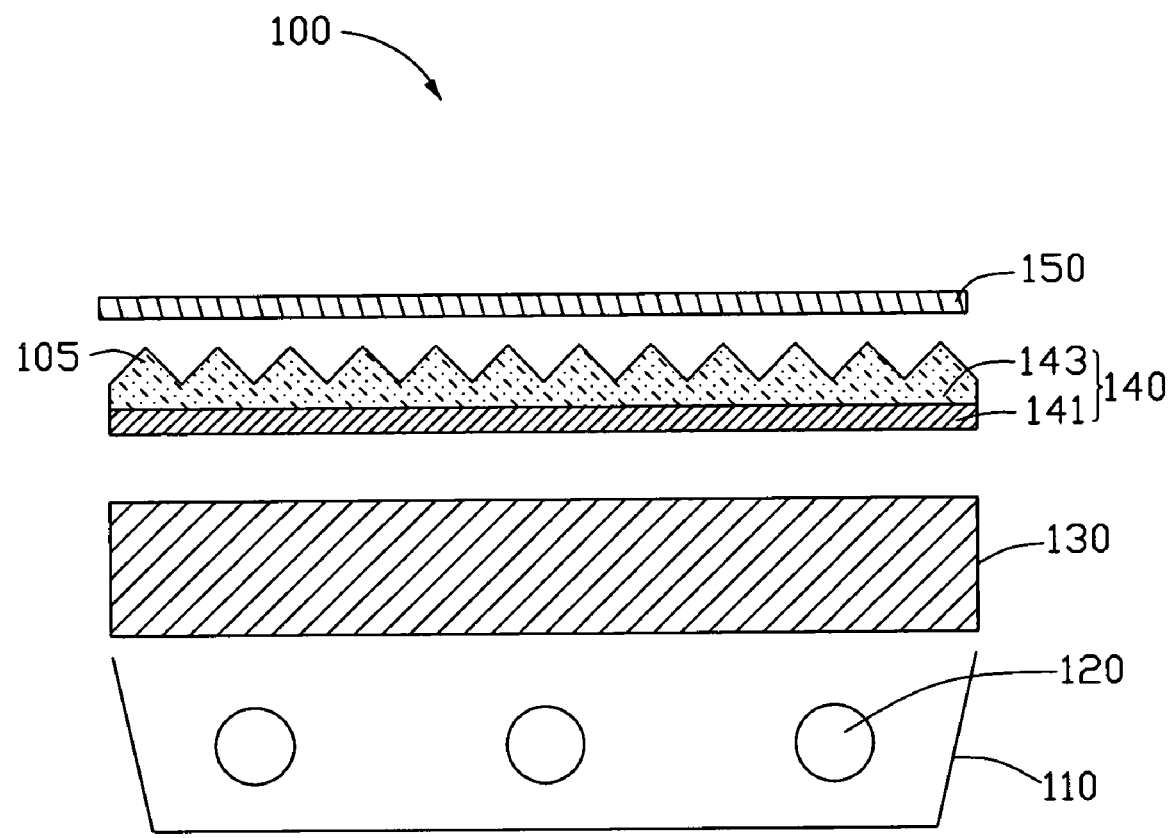
FIG. 12 is a side cross-sectional view of a typical backlight module including a typical prism sheet.
Figure 13:
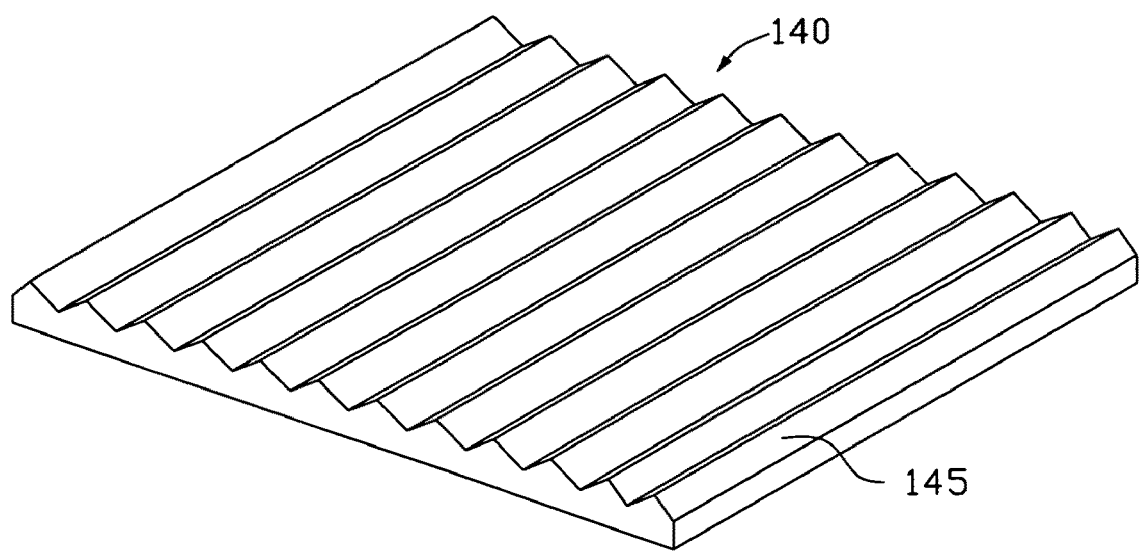
FIG. 13 is an isometric view of the typical prism sheet of the backlight module of FIG. 14.
Figure 15:
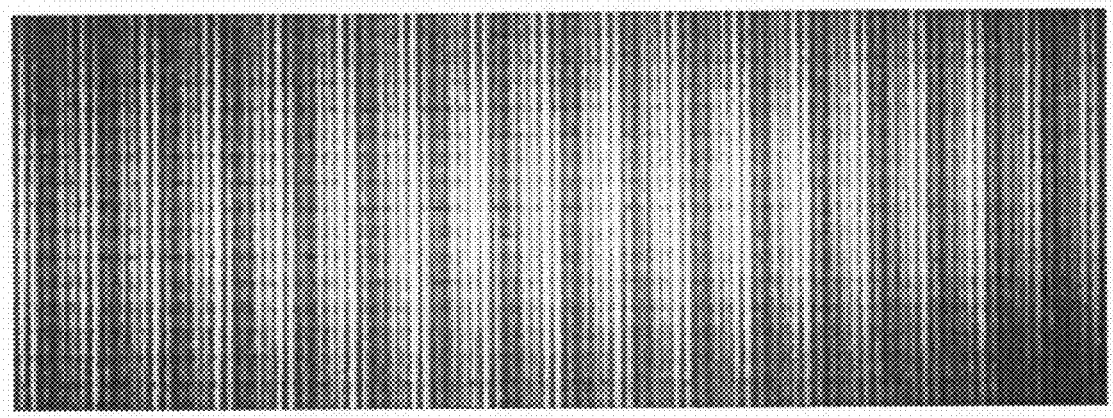
FIG. 15 is a photo showing an illumination distribution in a test on a LCD panel employing the typical backlight module using the prism sheet shown in FIG. 13.

Referring to FIGS. 12 and 15, Morie Interference fringes appear on the panel when the typical prism sheet 10 is employed (shown in FIG. 15). In contrast, no interference fringe appears on the panel when the light diffusion plate 20 is employed (shown in FIG. 12). The test results show the light diffusion plate 20 can prevent Morie Interference.

Figure 11:
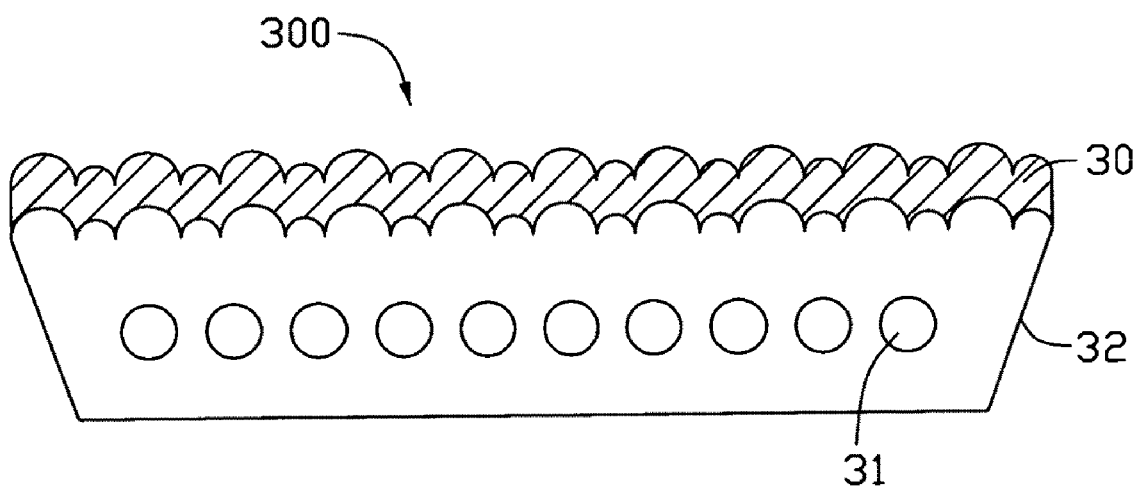
FIG. 11 is a cross-sectional view of a second embodiment of a backlight module.

Referring to FIG. 11, a second embodiment of a backlight module 300 is similar in principle to the first embodiment of the first backlight module 200. The backlight module 300 includes light diffusion plate 30, light sources 31 and a frame 300. The extending direction of the groove structures in the first surface (not labeled) is substantially parallel to the extending direction of the protrusion structures on the second surface (not labeled). The groove structures in the first surface extend from the first surface, and the protrusion structures on the second surface are extend from the second surface.

Finally, while the embodiments have been described and illustrated, the present disclosure is not to be construed as being limited thereto. Various modifications can be made to the embodiments by those of ordinary skilled in the art without departing from the true spirit and scope of the embodiments as defined by the appended claims.

What is claimed is:

1. A light diffusion plate, comprising:
a first surface defining a plurality of first elongated arc-shaped grooves and a plurality of second elongated arc-shaped grooves therein, each first elongated arc-shaped groove and each second elongated arc-shaped groove alternately positioned in the first surface, a width of each first elongated arc-shaped groove gradually decreasing and a width of each second elongated arc-shaped groove gradually increasing along the direction from a first side surface to an opposite second side surface of the light diffusion plate; and
a second surface opposite the first surface comprising a plurality of first elongated arc-shaped protrusions and a plurality of second elongated arc-shaped protrusions formed thereon, each first elongated arc-shaped protrusion and each second elongated arc-shaped protrusion are alternately positioned on the second surface, a width of the first elongated arc-shaped protrusions gradually decreasing and a width of the second elongated arc-shaped protrusions gradually increasing along the direction from a third side surface of the light diffusion plate to an opposite fourth side surface, wherein the third and fourth side surfaces intersect with the first and second side surfaces.

2. The light diffusion plate of claim 1, wherein a depth of the first elongated arc-shaped grooves decreases and a depth of the second elongated arc-shaped grooves increases along the direction from the first side surface to the second side surface.

3. The light diffusion plate of claim 1, wherein a pitch between adjacent first and second elongated arc-shaped groove is about 0.025 mm to about 1.5 mm, and a depth of the first elongated arc-shaped grooves and second elongated arc-shaped grooves is about 0.025 mm to about 1.5 mm.

4. The light diffusion plate of claim 1, wherein a height of the first elongated arc-shaped protrusions decreases and a height of the second elongated arc-shaped protrusions increases along the direction from the third side surface to the fourth side surface.

5. The light diffusion plate of claim 1, wherein a pitch between adjacent first and second elongated arc-shaped protrusion is about 0.025 mm to about 1.5 mm, and a height of the first elongated arc-shaped protrusions and the second elongated arc-shaped protrusions is about 0.01 mm to about 3 mm.

6. The light diffusion plate of claim 1, wherein a cross-section of each elongated arc-shaped groove taken along a plane perpendicular to the extending direction of the elongated arc-shaped grooves is substantially semicircular, and a cross-section of each elongated arc-shaped protrusion taken along a plane perpendicular to the extending direction of the elongated arc-shaped protrusions is substantially semicircular.

7. The light diffusion plate of claim 1, wherein a cross-section of the first elongated arc-shaped grooves and the second elongated arc-shaped grooves is about 0.006 mm to about 3 mm, and a radius of a cross-section of each of the first elongated arc-shaped protrusions and the second elongated arc-shaped protrusions is about 0.006 mm to about 3 mm.

8. A light diffusion plate comprising:
a first surface defining a plurality of first elongated arc-shaped grooves and a plurality of second elongated arc-shaped grooves therein, each first elongated arc-shaped groove and each second elongated arc-shaped groove alternately positioned in the first surface, a width of each first elongated arc-shaped groove gradually decreasing and a width of each second elongated arc-shaped groove gradually increasing along the direction from a first side surface to an opposite second side surface of the light diffusion plate; and
a second surface opposite the first surface comprising a plurality of first elongated arc-shaped protrusions and a plurality of second elongated arc-shaped protrusions formed thereon, each first elongated arc-shaped protrusion and each second elongated arc-shaped protrusion are alternately positioned on the second surface, a width of the first elongated arc-shaped protrusions gradually decreasing and a width of the second elongated arc-shaped protrusions gradually increasing along the direction from the first side surface to the second side surface.

9. The light diffusion plate of claim 8, wherein a depth of the first elongated arc-shaped grooves decreases and a depth of the second elongated arc-shaped grooves increases along the direction from the first side surface to the second side surface.

10. The light diffusion plate of claim 8, wherein a height of the first elongated arc-shaped protrusions decreases and a height of the second elongated arc-shaped protrusions increases along the direction from the third side surface to the fourth side surface.

11. The light diffusion plate of claim 8, wherein an extending direction of the first elongated arc-shaped grooves and the second elongated arc-shaped grooves is substantially parallel to an extending direction of the first elongated arc-shaped protrusions and the second elongated arc-shaped protrusions.

12. A backlight module, comprising:
a frame;
a plurality of light sources positioned in an inner surface of the frame; and
a light diffusion plate positioned on the frame above the light sources, the light diffusion plate comprising:
a first surface defining a plurality of first elongated arc-shaped grooves and a plurality of second elongated arc-shaped grooves therein, each first elongated arc-shaped groove and each second elongated arc-shaped groove alternately positioned in the first surface, a width of each first elongated arc-shaped groove gradually decreasing and a width of each second elongated arc-shaped groove gradually increasing along the direction from a first side surface to an opposite second side surface of the light diffusion plate; and a second surface opposite the first surface comprising a plurality of first elongated arc-shaped protrusions and a plurality of second elongated arc-shaped protrusions formed thereon, each first elongated arc-shaped protrusion and each second elongated arc-shaped protrusion are alternately positioned on the second surface, a width of the first elongated arc-shaped protrusions gradually decreasing and a width of the second elongated arc-shaped protrusions gradually increasing along the direction from a third side surface of the light diffusion plate to a fourth side surface opposite to the third side surface, the third and fourth side surfaces intersecting with the first and second side surfaces.

13. The backlight module of claim 12, wherein the first surface of the light diffusion plate faces the light sources.

14. The backlight module of claim 12, wherein the light sources are a plurality of light emitting diodes arranged in a straight line.

15. The backlight module of claim 14, wherein the extending direction of the elongated arc-shaped protrusions are substantially parallel to a longitudinal direction of the light sources.

16. The backlight module of claim 12, wherein the frame has a highly reflective inner surface.

17. The backlight module of claim 12, wherein the light diffusion plate comprises a plurality of light diffusion particles uniformly dispersed in the diffusion plate.

* * * * *